G. E. LANGFORD.
METHOD OF UNITING LAYERS OF RUBBER OF UNLIKE CHARACTER.
APPLICATION FILED SEPT. 15, 1921.
1,402,872.
Patented Jan. 10, 1922.
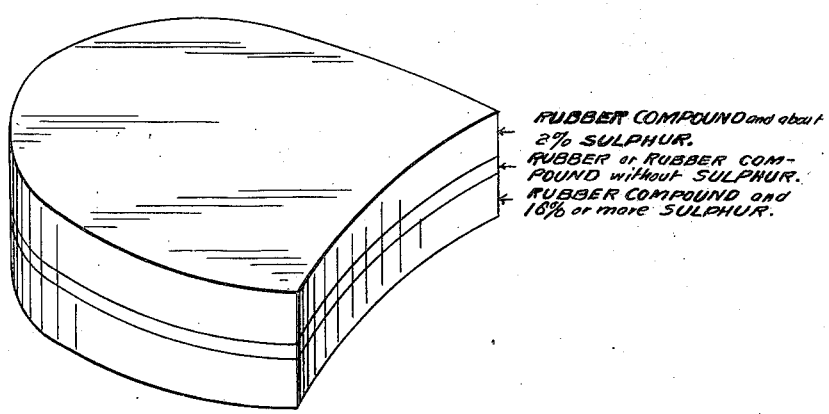

UNITED STATES PATENT OFFICE.

GEORGE E. LANGFORD, OF WASHINGTON, DISTRICT OF COLUMBIA.

METHOD OF UNITING LAYERS OF RUBBER OF UNLIKE CHARACTER.

1,402,872.   Specification of Letters Patent.   Patented Jan. 10, 1922.

Application filed September 15, 1921. Serial No. 500,728.

*To all whom it may concern:*

Be it known that I, GEORGE E. LANGFORD, a citizen of the United States of America, and resident of Washington, in the District of Columbia, have invented certain new and useful Improvements in Method of Uniting Layers of Rubber of Unlike Character, of which the following is a specification.

This invention relates to a process for treating vulcanizable rubber, and has for an object to provide for the production of finished rubber, the layers of which may be of different degrees of hardness wherein the joint between the layers of rubber is properly cured to effect a union of the hard and soft rubber without any weak joint between the said layers. Furthermore, the material at the joint between the layers of rubber is strong and durable, and will not deteriorate while in use to a greater extent than the layers of rubber which it unites.

It is well known that heretofore where layers of rubber are to be vulcanized together and where one layer is composed of rubber and sulphur, which sulphur may be termed the vulcanizing agent, in such proportions as to produce a hard rubber and the first mentioned layer is to be joined to a layer composed of rubber and sulphur proportioned to produce soft rubber, difficulty has been experienced in uniting these layers of rubber of unlike characteristics, as the joint or the material interposed between the layers to form the binding agent is usually undercured or overcured as compared with the layers which it unites, and the agent employed as the binder deteriorates more rapidly than the rubbers which it unites.

The inventor has, by a novel method, effected a union or joint between rubbers of unlike characteristics which overcomes the objections noted, producing a superior product, and when this method is employed in the manufacture of solid or cushion automobile tires or rubber heels for shoes, and other rubber articles, he has been able to unite a hard, strong and tough base with a yielding, cushioning tread surface in such a manner that there is no liability of the breaking down of the joint between the two. In fact, he has found that where strain is exerted on the materials, a break will occur at places away from the joint rather than at the joint, and so the superior quality of the union will be apparent.

It is a further object of this invention to vulcanize the layers of rubber when the proportions of rubber and sulphur vary in the compositions, using a vulcanizable gum between the layers of rubber which are impregnated with sulphur, the said binding agent being preferably free of sulphur, although results are attainable with the use of a small percentage of sulphur in the binder. By the term "binder" the inventor refers to the material employed to control the migration of sulphur and the material which may be said to form the joint.

In describing the invention in detail, reference will be had to the accompanying drawings forming part of this application in which a shoe heel is illustrated composed of layers of rubber, the layers having variable degrees of sulphur in them, whereas the binder, in the present embodiment, is entirely free of sulphur.

In carrying the invention into practice, I employ rubber and sulphur together with the desired fillers, accelerators and the like, as known in the art, in such proportions as will give the desired characteristics to the layers of rubber which it is intended to unite. For a base, it is usually preferable to have a high percentage of sulphur to give rigidity to the product, and while the inventor does not wish to be limited with respect to the proportions, he has found that a composition having twenty-six per cent of crude rubber, forty-two per cent of reclaimed rubber, and sixteen per cent of sulphur, with fillers and accelerators to make one hundred per cent when properly vulcanized will produce a relatively hard, strong base, although said base will not be brittle. A greater or smaller percentage of sulphur can be employed, as one skilled in the art will understand.

Associated with this composition having sixteen per cent of sulphur, I employ a composition having forty-two per cent of crude rubber and two per cent of sulphur together with fillers to make one hundred per cent, and which when properly vulcanized, will produce a strong and tough, but resilient and cushioning rubber, and when these two compositions above referred to, are vulcanized at the same temperature and for the same length of time, their characteristics will be quite unlike each other. In order to produce the joint or bond between these rubbers of unlike characters having the durability of which mention has been made, a layer of the soft rubber mentioned above, but without sulphur, is interposed between the layer of rubber having the greater amount of sulphur and the one having the lesser amount of sulphur, and the three layers are then subjected to the vulcanizing process, and the result is that the rubber without sulphur will be vulcanized to a degree which will produce the joint described. In some cases, a layer of crude rubber without sulphur, and without fillers can be used to advantage.

Soft rubber is properly produced when containing from two to three per cent of combined sulphur while hard rubber contains as high as thirty-two per cent of combined sulphur, and the inventor's theory with respect to the joint or bond described above is that the sulphur in the highly impregnated layer migrates and impregnates the layer of rubber which is without sulphur to such an extent as to make it vulcanizable. Where a layer of rubber impregnated with sulphur is employed to form the joint between the rubbers of unlike character, an excess of sulphur develops in the binder due to the migration of the sulphur from the more highly impregnated layer, and in the processes heretofore employed in which the binder is impregnated with sulphur, the binder becomes overcured or so otherwise affected to a degree where an imperfect joint results.

The thickness of the layer of rubber without sulphur which is employed between the layers containing sulphur will depend upon the thickness and percentage of sulphur in the more highly impregnated layer and the temperature and time of cure. For layers substantially the thicknesses shown in the drawing, the thickness of the rubber without sulphur indicated in the drawing is approximately the correct proportion, although obviously one skilled in the art may modify the same within certain proportions without departing from the spirit of the invention.

I claim:

1. The herein described method of uniting masses of rubber of unlike character, consisting in interposing rubber without sulphur between vulcanizable masses of rubber having sulphur of unlike proportions, and in vulcanizing the said masses.

2. A method of controlling the migration of a vulcanizing agent when producing and joining or uniting hard and soft rubber by vulcanizing, consisting in interposing rubber free of a vulcanizing agent between and in contact with masses of rubber prepared to produce the hard and soft rubber and vulcanizing them simultaneously.

3. The herein described method of uniting masses of rubber containing vulcanizing agent in unlike proportions for producing rubber of unlike vulcanizable character, consisting in interposing rubber without a vulcanizing agent between said masses of vulcanizable rubber and in contact with said masses, and in vulcanizing the masses at the same temperature.

GEORGE E. LANGFORD.